Patented Apr. 11, 1939

2,153,987

UNITED STATES PATENT OFFICE

2,153,987

VINYL ESTERS AND A PROCESS OF PREPARING THEM

Otto Nicodemus, Heinrich Lange, and Otto Horn, Frankfort-on-the-Main-Hochst, Germany, assignors to I. G. Farbenindustrie Aktiengesellschaft, Frankfort-on-the-Main, Germany No Drawing. Application February 20, 1936, Serial No. 64,932. In Germany March 1, 1935

11 Claims. (Cl. 260—485)

The present invention relates to vinyl esters and a process of preparing them.

In U. S. patent application Ser. No. 64,931 of even date filed in the name of Heinrich Lange and Otto Dorrer there is described a process of preparing vinyl esters by the action of acetylene on carboxylic acids in the presence of mercury compounds and borontrifluoride acetic acid, if necessary with the addition of hydrofluoric acid.

On further investigating this process we have found that on using the mercury compounds together with borontrifluoride-acetic acid, if necessary with the addition of hydrofluoric acid, the mono-esters of dicarboxylic acids may readily be caused to react with acetylene so that the vinyl esters of these mono-esters of dicarboxylic acids may be obtained. This result is very surprising because, contrary to the behavior of monocarboxylic acids, dicarboxylic acids cannot be caused to react with acetylene in the presence of hydrofluoric acid, mercury compounds and borontrifluoride-acetic acid and because, as is known, the mono-esters of dicarboxylic acids are very readily transformed into their neutral esters and free acids. It was to be expected that the latter reaction would be accelerated in the presence of borontrifluoride.

The vinyl esters of the mono-esters of dicarboxylic acids may also be prepared by using borontrifluoride instead of borontrifluoride-acetic acid, if necessary also without the addition of hydrogen fluoride, furthermore boric acid and boric anhydride with the addition of hydrogen fluoride. Such processes are described in the U. S. Patents No. 1,912,608 dated June 6, 1933, and 2,021,873 dated November 19, 1935, in the U. S. patent application Ser. No. 30,472 filed July 9, 1935, in the name of Otto Nicodemus and Walter Weibezahn, and in the U. S. patent application Serial No. 64,931 of even date filed in the name of Heinrich Lange and Otto Dorrer. The alkyl-vinyl esters obtained according to the above described process by the action of acetylene on alkyl-mono-esters of dicarboxylic acids lead to new, hitherto unknown, neutral, mixed esters having a vinyl group. These bodies may be readily polymerized so as to obtain products which show entirely new, surprisingly good properties with regard to solubility, stability, solidity and the like. As aliphatic dicarboxylic acids there may be applied: oxalic acid, malonic acid, succinic acid, maleic acid, fumaric acid; as esters there may be used the methyl esters, the ethyl esters, the propyl esters and the butyl esters.

The following examples serve to illustrate the invention, but they are not intended to limit it thereto; the parts are by weight:

(1) To 100 parts of oxalic acid monoethyl ester there are added 1 part of mercuric oxide and 1 part of a solution containing 16 parts of borontrifluoride-acetic acid in glacial acetic acid and at about 30° C. acetylene is introduced, while well stirring. After 2 to 3 hours when the absorption of acetylene is nearly finished, 4 parts of anhydrous sodium acetate are added, the whole is well stirred and the oxalic acid-vinyl-ethyl ester formed is distilled under a reduced pressure. By a second distillation the oxalic acid vinyl-ethyl ester which boils at 68° C. to 70° C. under a pressure of 9 millimeters of mercury may be obtained in a pure state. It forms a colorless liquid which may be readily polymerized so as to obtain products which are distinguished by an excellent stability to water and a good solubility in suitable organic solvents.

(2) To 100 parts of fumaric acid monoethyl ester there are added 2 parts of mercuric oxide, 2 parts of a solution containing 16 parts of borontrifluoride-acetic acid in glacial acetic acid, as well as 0.05 part of hydrofluoric acid and at 35° C. to 40° C. acetylene is introduced, while well stirring. When the absorption of acetylene is finished, that is after 3 to 4 hours, 4 parts of anhydrous sodium acetate are added, the whole is well stirred and the fumaric acid vinyl-ethyl ester formed is distilled under a reduced pressure. The ester boils at 112° C. under a pressure of 11 millimeters of mercury. It forms a colorless liquid which may be readily polymerized so as to obtain products having an especially great hardness.

(3) To 100 parts of maleic acid monoethyl ester there are added 1 part of mercuric oxide and 1 part of a solution containing 16 parts of borontrifluoride-acetic acid in glacial acetic acid and at 30° C. to 40° C. acetylene is introduced, while well stirring. After 2 to 3 hours when the absorption of acetylene is finished 4 parts of anhydrous sodium acetate are added and the whole is well stirred. In order to remove the last portions of the mono-ester which has not entered into reaction the reaction product is stirred with lead carbonate, dried with dehydrated calcium sulfate, treated with decolorizing carbon and filtered. Just as the maleic acid monoethyl ester, the maleic acid vinyl-ethyl ester can likewise not be distilled.

(4) Into 100 parts of oxalic acid monoethyl ester there is introduced 0.1 part of borontrifluoride, 1 part of mercuric oxide is added and at about 30° C., acetylene is introduced, while well stirring. After 3 to 4 hours, when the absorption of acetylene is nearly finished, 4 parts of anhydrous sodium acetate are added, the whole is well stirred and the oxalic acid vinyl-ethyl ester formed is distilled under a reduced pressure (boiling point at 68° C. to 70° C. under a pressure of 9 millimeters of mercury).

(5) Into 100 parts of oxalic acid monoethyl ester there is introduced 0.1 part of borontrifluoride, 1 part of mercuric oxide and 0.05 part of hydrofluoric acid are added and at 25° C. to 30° C. acetylene is introduced while well stirring. After 2 to 3 hours, when the absorption of acetylene is finished, 4 parts of anhydrous sodium acetate are added, the whole is well stirred and the oxalic vinyl-ethyl ester formed is distilled at 68° C. to 70° C. under a pressure of 9 millimeters of mercury.

(6) Into 100 parts of maleic acid monoethyl ester there is introduced 0.1 part of borontrifluoride, 1 part of mercuric oxide and 0.1 part of hydrofluoric are added and at 30° C. to 40° C. acetylene is introduced, while well stirring. After 2 hours the absorption of acetylene is finished. 4 parts of anhydrous sodium acetate are then added, the whole is well stirred and in order to remove the mono-ester which has not entered into reaction, the reaction product is stirred with lead carbonate, dried with dehydrated calcium sulfate, treated with decolorizing carbon and then filtered.

We claim:

1. The process which comprises acting with acetylene upon a lower aliphatic mono-ester of a lower aliphatic dicarboxylic acid containing no hydroxyl groups in the presence of a mercury compound promoting the addition of acetylene to aliphatic monocarboxylic acids and in the presence of a catalyst of the group consisting of borontrifluoride-acetic acid, borontrifluoride, borontrifluoride-acetic acid plus hydrogen fluoride, borontrifluoride plus hydrogen fluoride, boric acid plus hydrogen fluoride and boric anhydride plus hydrogen fluoride.

2. The process which comprises acting with acetylene upon a lower aliphatic mono-ester of a lower aliphatic dicarboxylic acid containing no hydroxyl groups in the presence of a mercuric oxide and in the presence of a catalyst of the group consisting of borontrifluoride-acetic acid, borontrifluoride, borontrifluoride-acetic acid plus hydrogen fluoride, borontrifluoride plus hydrogen fluoride, boric acid plus hydrogen fluoride and boric anhydride plus hydrogen fluoride.

3. The process which comprises acting with acetylene upon oxalic acid monoethyl ester in the presence of mercuric oxide and of borontrifluoride-acetic acid.

4. The process which comprises acting with acetylene upon fumaric acid monoethyl ester in the presence of mercuric oxide and of borontrifluoride-acetic acid.

5. The process which comprises acting with acetylene upon maleic acid monoethyl ester in the presence of mercuric oxide, of borontrifluoride and of hydrogen fluoride.

6. The mixed alkyl-vinyl esters of lower aliphatic dicarboxylic acids containing no hydroxyl groups, said products being colorless clear liquids easily capable of polymerizing.

7. The mixed alkyl-vinyl esters of lower aliphatic dicarboxylic acids, said products being colorless clear liquids easily capable of polymerizing.

8. The mixed ethyl-vinyl esters of lower aliphatic dicarboxylic acids, said products being colorless clear liquids easily capable of polymerizing.

9. The mixed ethyl-vinyl ester of oxalic acid said product being a colorless clear liquid easily capable of polymerizing.

10. The mixed ethyl-vinyl ester of maleic acid said product being a colorless clear liquid easily capable of polymerizing.

11. The mixed ethyl-vinyl ester of fumaric acid said product being a colorless clear liquid easily capable of polymerizing.

OTTO NICODEMUS.
HEINRICH LANGE.
OTTO HORN.